United States Patent
Park et al.

(10) Patent No.: US 10,975,515 B2
(45) Date of Patent: Apr. 13, 2021

(54) WASHING MACHINE

(71) Applicant: LG Electronics Inc., Seoul (KR)

(72) Inventors: Suil Park, Seoul (KR); Minseong Kim, Seoul (KR); Jinhyouk Shin, Seoul (KR); Youngsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 16/374,224

(22) Filed: Apr. 3, 2019

(65) Prior Publication Data
US 2019/0301076 A1   Oct. 3, 2019

(30) Foreign Application Priority Data
Apr. 3, 2018   (KR) .................. 10-2018-0038867

(51) Int. Cl.
*D06F 39/08* (2006.01)
*F16K 11/04* (2006.01)

(52) U.S. Cl.
CPC ............ *D06F 39/085* (2013.01); *F16K 11/04* (2013.01); *D06F 2204/082* (2013.01); *D06F 2204/084* (2013.01)

(58) Field of Classification Search
CPC combination set(s) only.
See application file for complete search history.

(56) References Cited

U.S. PATENT DOCUMENTS

| | | | |
|---|---|---|---|
| 2007/0228181 A1* | 10/2007 | Robinson | G05D 23/1393 236/12.11 |
| 2009/0229312 A1* | 9/2009 | Chung | D06F 39/083 68/12.19 |
| 2010/0275386 A1* | 11/2010 | Ko | D06F 33/00 8/158 |

FOREIGN PATENT DOCUMENTS

| | | |
|---|---|---|
| DE | 102014222050 | 3/2016 |
| DE | 102016201446 | 2/2017 |

OTHER PUBLICATIONS

German Office Action in German Application No. 102019204757.2, dated Jun. 19, 2020, 11 pages (with English translation).

* cited by examiner

*Primary Examiner* — Cristi J Tate-Sims
(74) *Attorney, Agent, or Firm* — Fish & Richardson P.C.

(57) ABSTRACT

A washing machine includes: a cabinet; a tub; a pump for discharging washing water received in the tub to an outside of the tub; and a valve assembly for introducing washing water discharged from the pump. The valve assembly includes: a valve housing; a first chamber defined inside the valve housing and configured to connect to a circulation flow path for sending washing water introduced from the pump to the tub and a drainage flow path for draining washing water introduced through the pump to an outside of the cabinet; a disc valve configured to linearly move in a vertical direction inside the first chamber and move upward by a pressure of washing water discharged from the pump; and a weight part disposed above the disc valve and configured to apply a load to the disc valve.

18 Claims, 13 Drawing Sheets

WASHING MACHINE

CROSS-REFERENCE TO RELATED APPLICATIONS

This application claims the benefit of an earlier filing date and right of priority to Korean Patent Application No. 10-2018-0038867, filed on Apr. 3, 2018, the contents of which is hereby incorporated by reference as if fully set forth herein.

BACKGROUND OF THE INVENTION

1. Field of the Invention

The present invention relates to a washing machine, and more particularly, to a washing machine including a valve for circulating or discharging washing water according to the pressure of washing water discharged from a pump.

2. Description of the Related Art

Generally, a washing machine is an apparatus that separates contaminants from clothing, bedding, etc. (hereinafter, referred to as "laundry") by using chemical decomposition of water and detergent and physical action such as friction between water and laundry.

Such a washing machine includes a tub containing water, a drain pipe discharging the washing water discharged from the tub to the outside, and a circulation pipe circulating the washing water discharged from the tub to the tub.

In order to pump the washing water discharged from the tub to the drain pipe or the circulation pipe, two pumps connected to respective pipes must be provided, which generates additional expenses corresponding to two pumps.

In addition, a single pump may be rotated in the forward direction or the reverse direction to connect the circulation pipe and the drain pipe in both directions. In this case, it is advantageous in that the cost is reduced, but there is a problem that backflow may occur due to malfunction of a pump motor.

SUMMARY OF THE INVENTION

The present invention has been made in view of the above problems, and provides a washing machine capable of draining or circulating washing water discharged from a tub by using a single pump.

The present invention further provides a washing machine capable of draining or circulating washing water discharged from a tub by using a pump operating in one direction.

The present invention further provides a washing machine which drains or circulates washing water discharged from a pump by using number of revolutions of a pump motor operating in a pump in a drainage mode and a circulation mode in a simple structure.

In accordance with an aspect of the present invention, a washing machine includes: a cabinet forming an outer shape; a tub for forming a space for storing washing water inside the cabinet; a pump for discharging the washing water stored in the tub to the outside of the tub; and a valve assembly for introducing the washing water discharged from the pump downward and discharging the washing water upward, wherein the valve assembly includes: a valve housing forming an outer shape and forming a space through which the washing water flows therein; a first chamber which forms a space inside the valve housing, and is connected to a circulation flow path for sending the washing water introduced from the pump to the tub and a drainage flow path for draining the washing water introduced through the pump to the outside of the cabinet; a disc valve which linearly moves in a vertical direction inside the first chamber and moves upward by a pressure of the washing water discharged from the pump; and a weight part for applying a load to the disc valve, wherein the disc valve selectively discharges the washing water introduced into the first chamber to the circulation flow path or the drainage flow path, depending on a difference between a magnitude of a pressure of the washing water discharged from the pump and a magnitude of a pressure due to weight of the weight part, so that the washing water discharged from the pump can flow into the circulation flow path or the drainage flow path depending on the pressure of the washing water and the weight of the weight part.

The disc valve connects the first chamber and the drainage flow path, when the pressure of the washing water discharged from the pump exceeds a set pressure, so that the washing water can flow into the drainage flow path or the circulation flow path depending on the arrangement of the disc valve.

The disc valve connects the first chamber and the circulation flow path, when the pressure of the washing water discharged from the pump is equal to or lower than a set pressure, so that the washing water can flow into the drainage flow path or the circulation flow path depending on the arrangement of the disc valve.

When the valve assembly is in a circulation mode in which the washing water is sent back to the tub, the pump discharges the washing water in such a manner that the pressure applied to the disc valve by the washing water discharged to the first chamber is equal to or lower than the pressure applied to the disc valve by the weight of the weight part, thereby using the pressure of the washing water discharged from the pump according to the mode of washing machine.

When the valve assembly is in a drainage mode in which the washing water is discharged to the outside of the cabinet, the pump discharges the washing water in such a manner that the pressure applied to the disc valve by the washing water discharged to the first chamber is greater than the pressure applied to the disc valve by the weight of the weight part, thereby using the pressure of the washing water discharged from the pump according to the mode of washing machine.

A first channel connecting the first chamber and the circulation flow path and a second channel connecting the first chamber and the drainage flow path are formed inside the valve housing, so that the washing water introduced into the first chamber can be supplied to the circulation flow path or the drainage flow path through the first channel or the second channel.

The disc valve includes: a first disc valve which is disposed inside the first chamber and opens/closes a channel communication hole formed between the first chamber and the first channel; a second disc valve which is disposed above the first chamber and opens/closes a chamber communication hole formed between the first chamber and the second channel; and a disc connecting bar connecting the first disc valve and the second disc valve, so that force acting on each of the first disc valve and the second disc valve can be transmitted fully.

The first disc valve receives pressure upward from the washing water introduced into the first channel, wherein the second disc valve receives pressure in a downward direction from the weight of the weight part which is disposed in the upper side to connect the first chamber and the circulation flow path, so that the disc valve can move in both directions.

The first disc valve includes: a disc plate receiving pressure of washing water introduced into the first chamber; and a sealer which is disposed in an upper side of the disc plate to seal the channel communication hole, so that the first disc valve moves upward to close the channel communication hole.

The second disc valve has a truncated conical shape whose area is reduced downward so as to open and close the chamber communication hole, so that the chamber communication hole can be effectively sealed.

The weight part includes: a first weight part which is disposed above the second disc valve and applies a load to the disc valve; and a second weight part which is connected to an upper end of the disc connecting bar and applies a load to the disc valve, thereby applying a load to the disc valve in a direction opposite to the flow direction of the washing water.

The first weight part includes: at least one first weight for applying a load to the disc valve; and a weight housing which is disposed above the second disc valve and forms a space for accommodating the first weight, so that the weight part can be formed by utilizing a space above the second disc valve.

The second weight part includes: at least one second weight for applying a load to the disc valve; a weight case forming a space for accommodating the second weight; and a weight part-connecting portion connecting the weight case and the disc connecting bar, so that the additional weight of the weight part can be adjusted.

The washing machine further includes: a disc guider having a guider groove into which the disc connecting bar is inserted so as to guide an upward and downward movement of the disc valve inside the valve housing, so that the disc valve can move up and down straightly.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, a washing machine according to embodiments of the present invention will be described with reference to the drawings.

<Configuration of Washing Machine>

Figure 1:
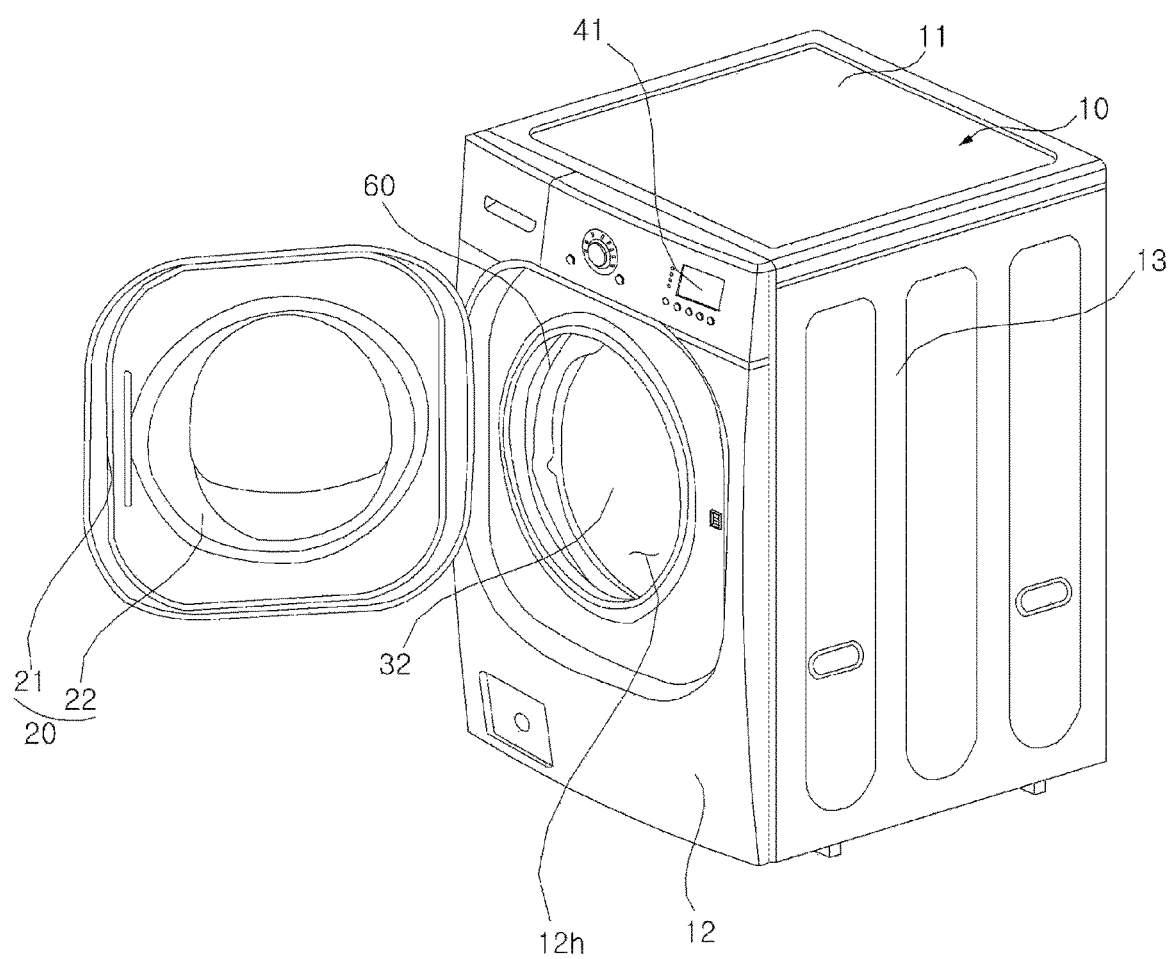
FIG. 1 is a perspective view of a washing machine according to an embodiment of the present invention.
Figure 2:
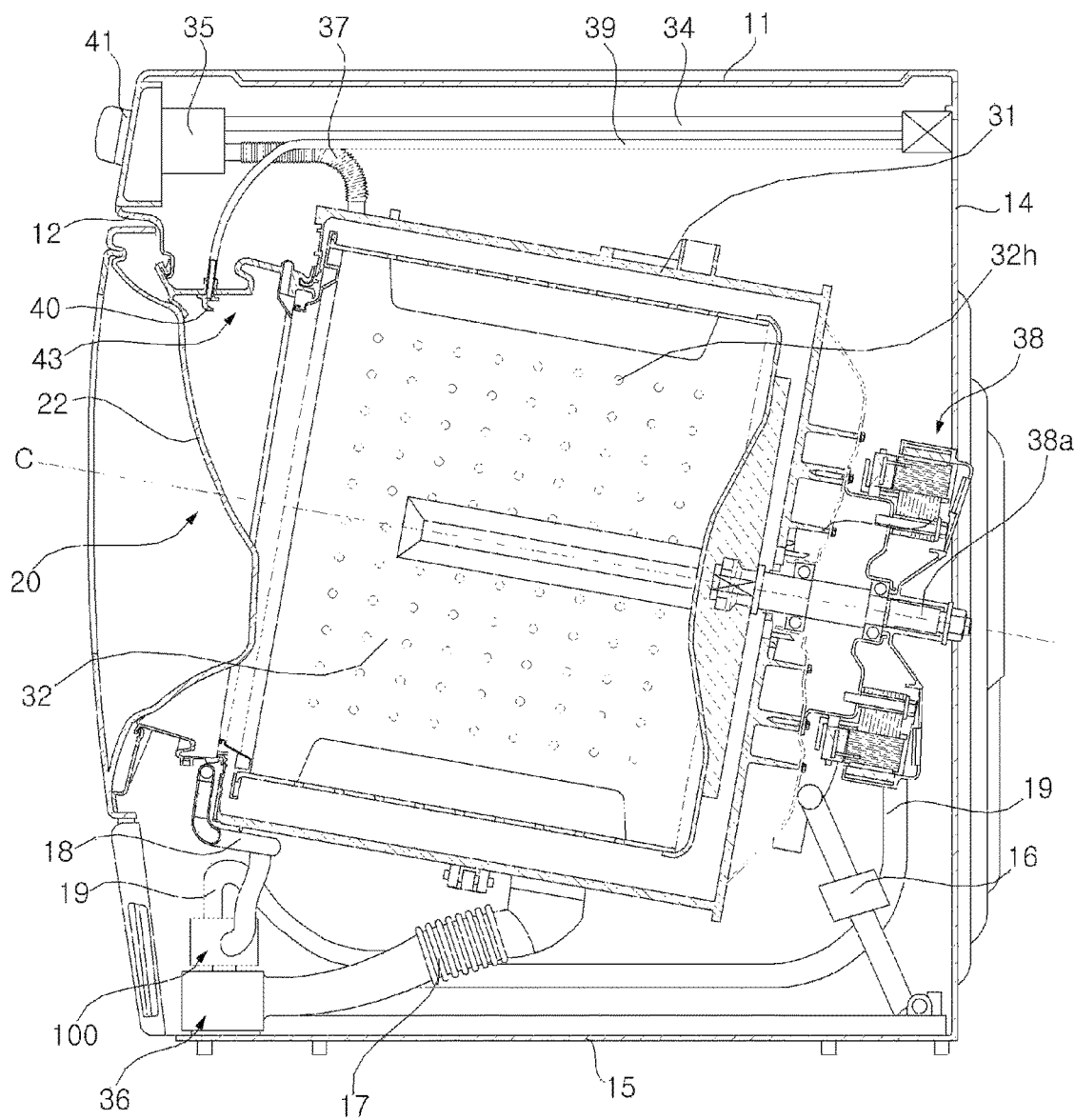
FIG. 2 is a side cross-sectional view of the washing machine shown in FIG. 1.

FIG. 1 is a perspective view of a washing machine according to an embodiment of the present invention. FIG. 2 is a side cross-sectional view of the washing machine shown in FIG. 1.

Referring to FIGS. 1 and 2, the washing machine according to an embodiment of the present invention includes a cabinet 10 defining an outer shape. The cabinet 10 has a substantially rectangular parallelepiped shape. The cabinet 10 includes a front surface 12 on which an input port 12h is formed frontward, a side surface 13 covering left and right sides, a rear surface 14 which covers the rear side and through which a part of a water supply pipe or drain pipe penetrates, a top surface 11 covering the upper side, and a bottom surface 15 supporting the washing machine. A control panel 41 disposed in the upper side of the front surface 12 may be disposed.

In the cabinet 10, a tub 31 containing washing water may be disposed. The tub 31 is provided with an opening formed in the front surface so that the laundry can be input, and the opening is communicated with the input port 12h formed in the cabinet 10 by a gasket 43.

A door 20 for opening and closing the input port 12h can be rotatably coupled to the cabinet 10. The door 20 may include a door frame 21 which is open substantially at a central portion and is rotatably coupled to the front surface 12 and a transparent window 22 provided in the open central portion of the door frame 21.

The gasket 43 is implemented to prevent the leakage of the washing water contained in the tub 31. The front end portion is coupled with the front surface 12 of the cabinet 10 and the rear end portion is coupled with the periphery of the opening of the tub 31. A portion between the front end portion and the rear end portion is extended in a cylindrical form. The gasket 43 may be made of a flexible or resilient material. The gasket 43 may be made of natural rubber or synthetic resin.

In the tub 31, a drum 32 in which laundry is accommodated may be rotatably provided. The drum 32 accommodates the laundry, and an opening through which the laundry is introduced is disposed on the front surface, and is rotated around a substantially horizontal rotation center line C. However, the above mentioned "horizontal" is not a term used mathematically as a strict sense. That is, when the rotation center line C is inclined at a certain angle (e.g., 5 degrees or less) with respect to the horizontal as in the embodiment, it is considered to be substantially horizontal because it is also close to be horizontal. A plurality of through holes 32h may be formed in the drum 32 so that washing water in the tub 31 can be introduced into the drum 32.

A driving unit 38 for rotating the drum 32 may be further provided. A driving shaft 38a rotated by the driving unit 38 may be coupled with the drum 32 while passing through the rear portion of the tub 31.

Preferably, the driving unit 38 includes a direct-coupling type motor. The motor may include a stator fixed to the rear of the tub 31, and a rotor rotated by magnetic force acting between the stator and the rotor. The driving shaft 38a may be rotated integrally with the rotor.

The tub 31 may be supported by a damper 16 installed in a base 15. The vibration of the tub 31 caused by the rotation of the drum 32 is attenuated by the damper 16. Although not shown, depending on an embodiment, a hanger (e.g., a spring) for hanging the tub 31 in the cabinet 10 may be further provided.

At least one water supply hose (not shown) for guiding the washing water supplied from an external water source such as a faucet to the tub 31, and a water supply unit 33 for interrupting the at least one water supply hose may be provided.

A dispenser 35 for supplying an additive such as a detergent, a fabric softener into the tub 31 or the drum 32 may be provided. In the dispenser 35, the additives may be separately accommodated according to their types. The dispenser 35 may include a detergent accommodating portion (not shown) for accommodating the detergent and a softener accommodating portion (not shown) for accommodating the fabric softener.

At least one water supply pipe 34 for selectively guiding the washing water supplied through the water supply unit 33 to each accommodating portion of the dispenser 35 may be provided. The water supply unit 33 may include at least one water supply valve for interrupting each water supply pipe 34.

The at least one water supply pipe 34 may include a first water supply pipe for supplying washing water to the detergent accommodating portion, and a second water supply pipe for supplying washing water to the softener accommodating portion. In this case, the at least one water supply valve may include a first water supply valve for interrupting the first water supply pipe, and a second water supply valve for interrupting the second water supply pipe.

The gasket 601 may be provided with a direct water nozzle 42 for spraying water into the drum 32, and a direct water supply pipe 39 for guiding the water supplied through the water supply unit 33 to the direct water nozzle 42. The water supply unit 33 may include a third water supply valve for interrupting the direct water supply pipe 39.

The washing water discharged from the dispenser 35 is supplied to the tub 31 through a water supply bellows 37. A water supply port (not shown) connected to the water supply bellows 37 may be formed in the tub 31.

The tub 31 is formed with a drainage port for discharging washing water, and a drainage bellows 17 may be connected to the drainage port. A pump 36 for pumping washing water discharged from the tub 31 through the drainage bellows 17 and a valve assembly 100 selectively sends the washing water discharged from the pump 36 to a drain pipe 19 or a circulation pipe 18 may be provided.

The pump 36 may serve to pump the washing water discharged from the tub 31 through the drainage bellows 17 to the valve assembly. The valve assembly 100 may selectively send the washing water pumped by the pump 36 to the drain pipe 19 or the circulation pipe 18. A pair of the circulation pipe 18 according to the present embodiment may be provided to supply washing water into the tub 31.

The pump 36 may include an impeller (not shown) for pumping washing water, a pump housing (not shown) for accommodating the impeller, and a pump motor (not shown) for rotating the impeller. The pump housing may be provided with an inflow port (not shown) through which the washing water is introduced through the drainage bellows 17 and a discharge port (not shown) through which the washing water pumped by the impeller is discharged to the valve assembly 100. The discharge port may be connected to a pump connector 150 of the valve assembly 100. The valve assembly 100 according to the present embodiment is disposed in the upper side of the pump 36.

The flow rate (or the pressure of discharged water) of the pump 36 is variable. To this end, the pump motor constituting the pump 36 may be a variable speed motor capable of controlling the rotation speed. The pump motor may be a Brushless Direct Current (BLDC) motor, but is not limited thereto. A driver for controlling the speed of the motor may be further provided, and the driver may be an inverter driver. The inverter driver converts AC power to DC power and inputs the DC power to the motor at a target frequency.

A controller for controlling the pump motor may be further provided. The controller may include a proportional-integral controller (PI controller), a proportional-integral-derivative controller (PID controller), and the like. The controller may receive the output value of the pump motor (e.g., the output current) as an input, and control the output value of the driver so that the number of revolutions of the pump motor follows a preset target number of revolutions.

<Valve Assembly>

Figure 3:
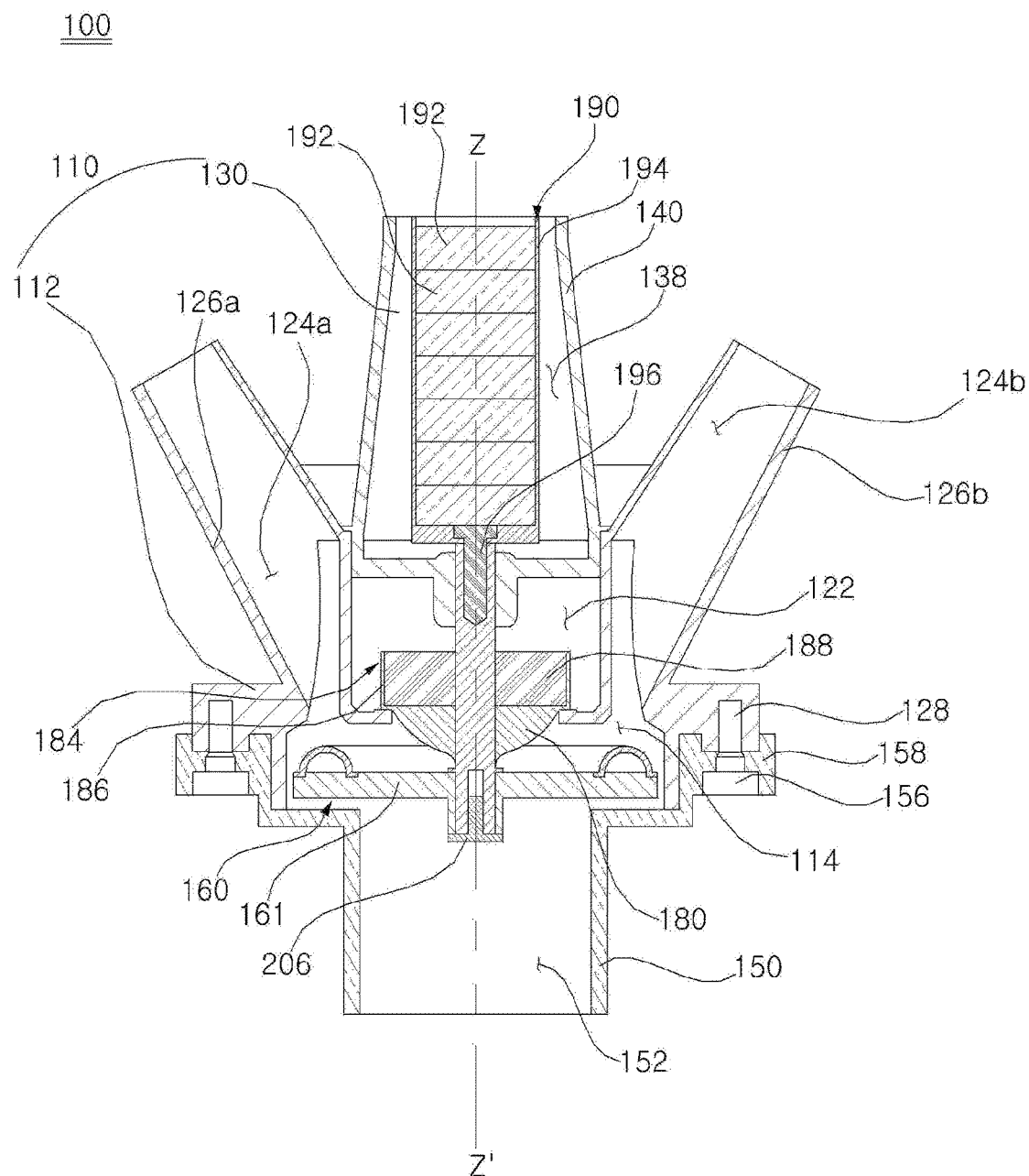
FIG. 3 is a cross-sectional view illustrating an internal configuration of a valve assembly according to an embodiment of the present invention.
Figure 4:
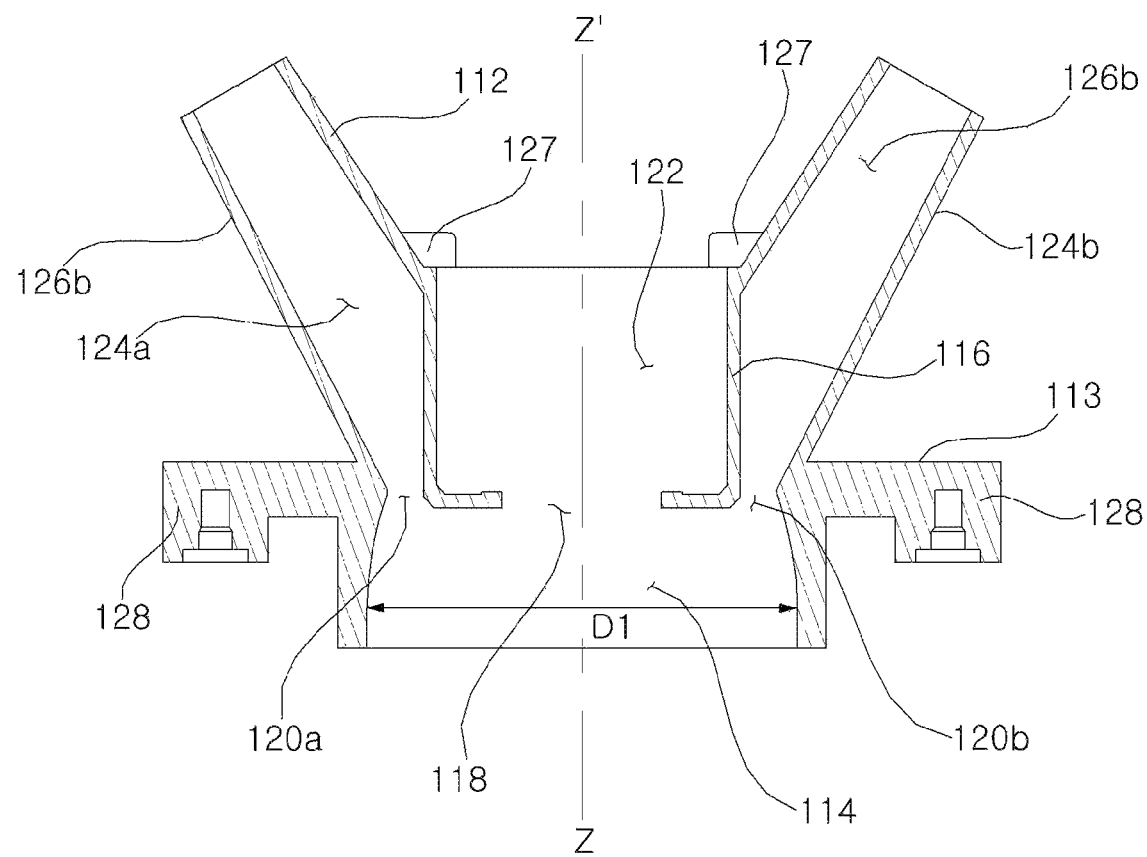
FIG. 4 is a cross-sectional view illustrating a configuration of a first valve housing according to an embodiment of the present invention.
Figure 5:
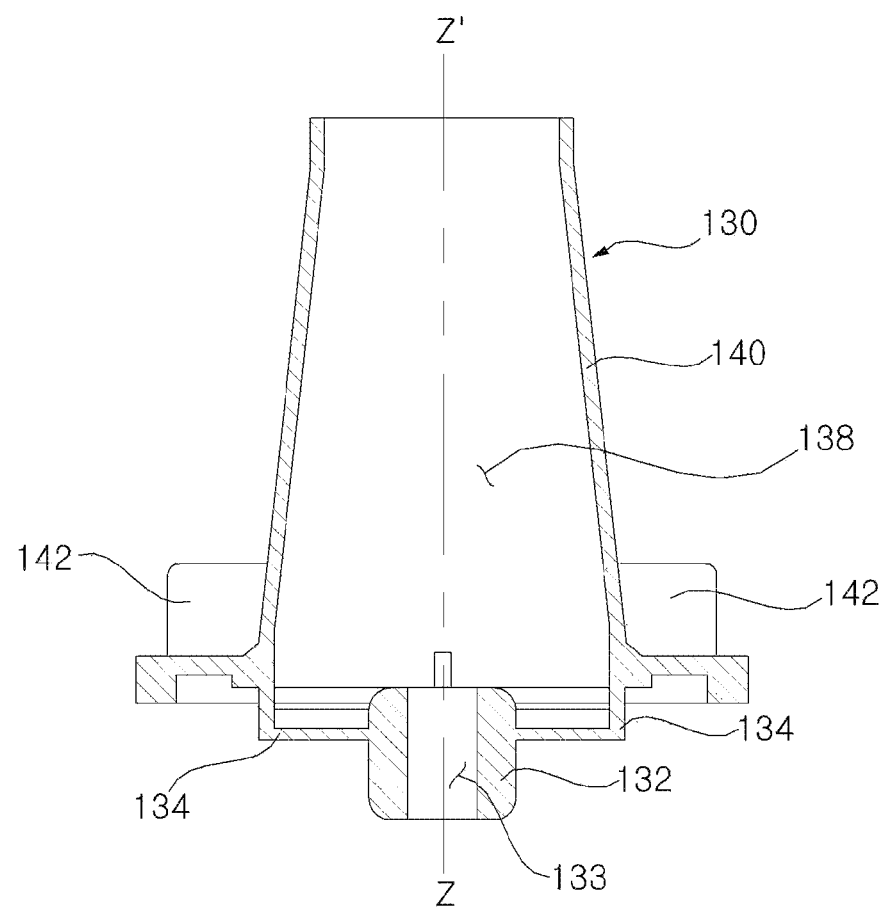
FIG. 5 is a cross-sectional view illustrating a configuration of a second valve housing according to an embodiment of the present invention.
Figure 6:
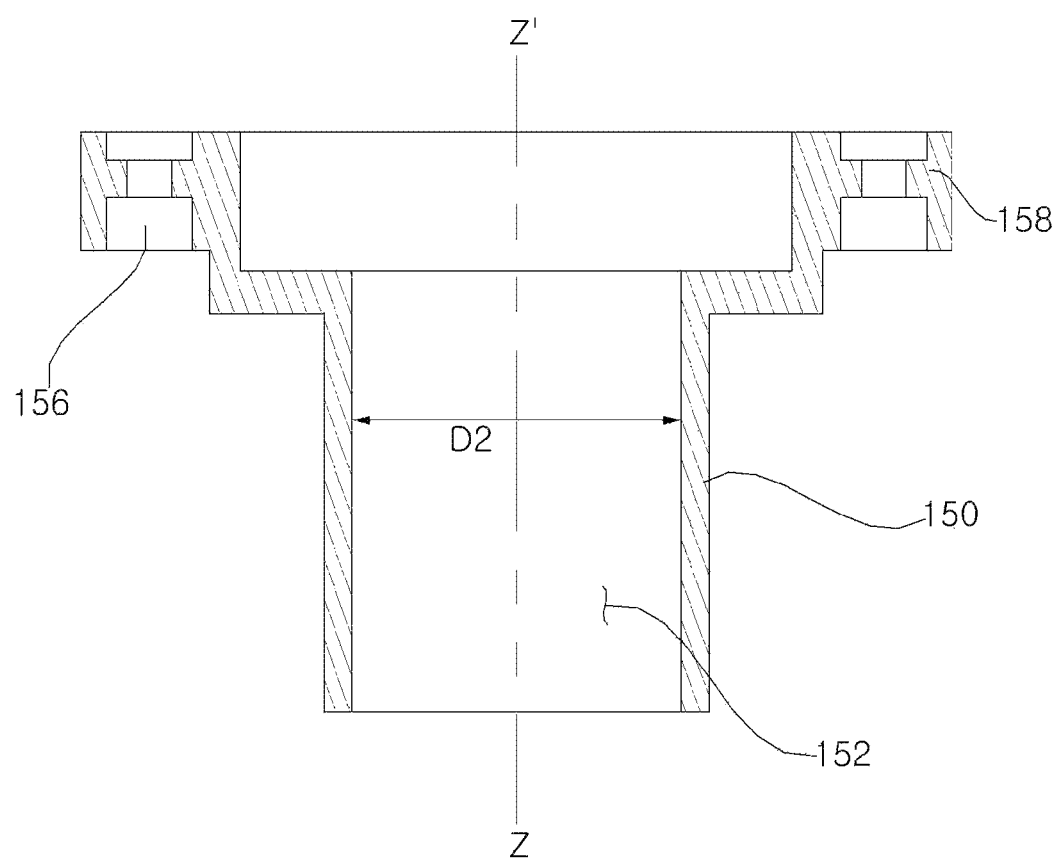
FIG. 6 is a cross-sectional view for explaining a configuration of a pump connector according to an embodiment of the present invention.
Figure 7A:
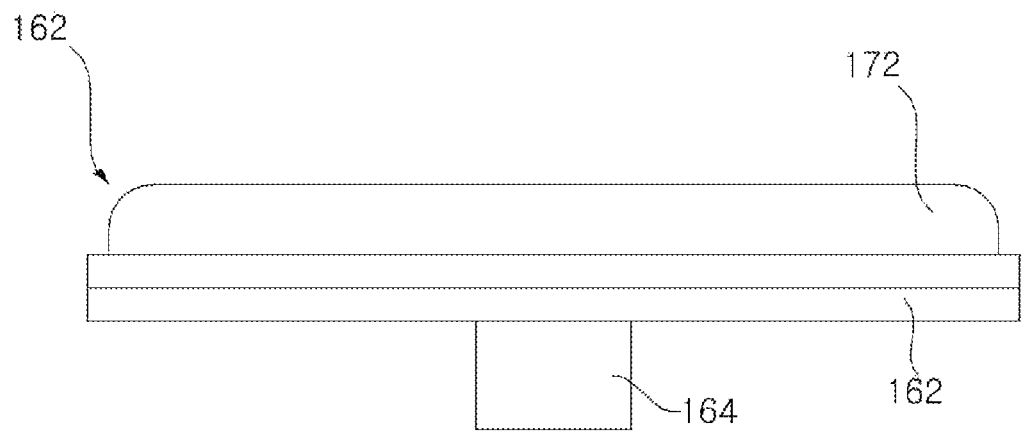
FIG. 7A is a side view of a first disc valve according to an embodiment of the present invention.
Figure 7B:
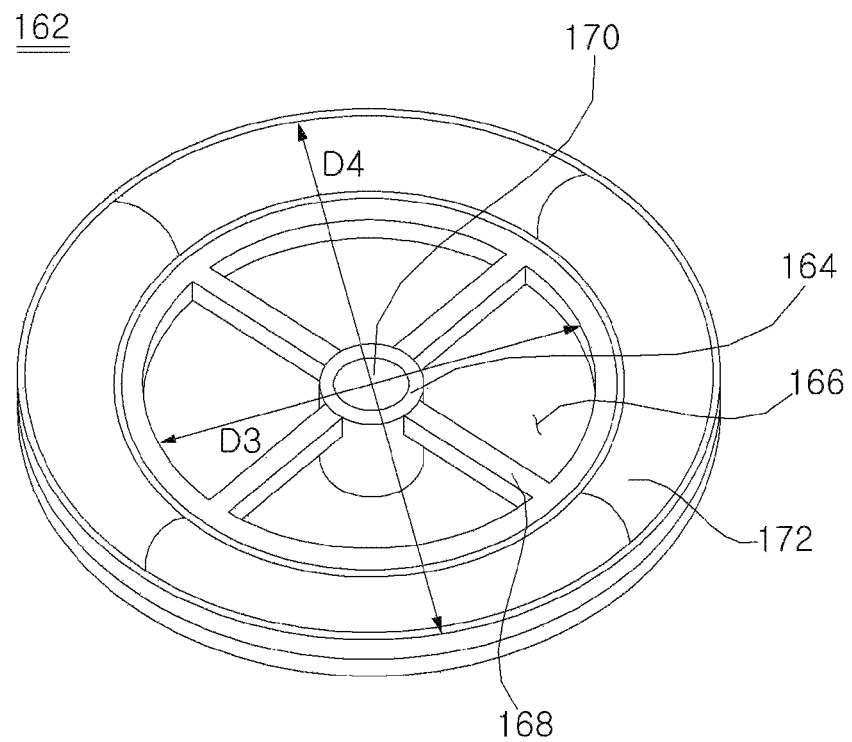
FIG. 7B is a perspective view of the first disc valve of FIG. 7A.
Figure 8:
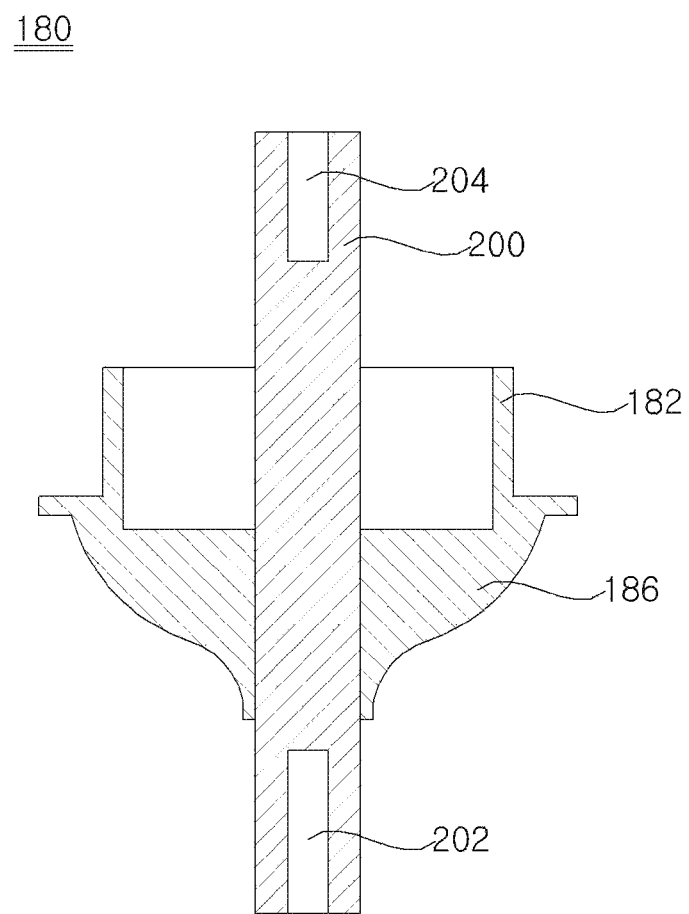
FIG. 8 is a cross-sectional view illustrating a second disc valve and a disc connecting bar according to an embodiment of the present invention.
Figure 9:
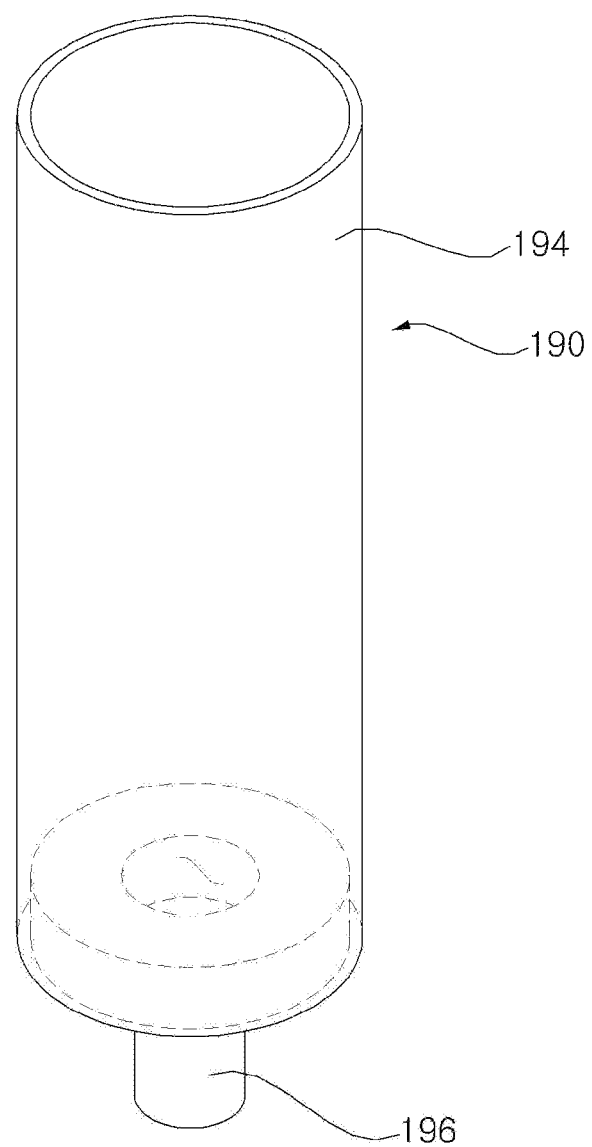
FIG. 9 is a view for explaining a weight part according to an embodiment of the present invention.

FIG. 3 is a cross-sectional view illustrating an internal configuration of a valve assembly according to an embodiment of the present invention. FIG. 4 is a cross-sectional view illustrating a configuration of a first valve housing according to an embodiment of the present invention. FIG. 5 is a cross-sectional view illustrating a configuration of a second valve housing according to an embodiment of the present invention. FIG. 6 is a cross-sectional view for explaining a configuration of a pump connector according to an embodiment of the present invention. FIG. 7 are a side view and a perspective view of a first disc valve according to an embodiment of the present invention. FIG. 8 is a cross-sectional view illustrating a second disc valve and a disc connecting bar according to an embodiment of the present invention. FIG. 9 is a view for explaining a weight part according to an embodiment of the present invention;

Hereinafter, the valve assembly according to the present embodiment will be described with reference to FIGS. 3 to 9.

The valve assembly according to the present embodiment selectively sends the washing water to the drain pipe 19 or the circulation pipe 18, according to the pressure of the washing water discharged from the pump 36. The valve assembly according to the present embodiment may send the washing water flowing into the valve assembly 100 to the drain pipe 19 or the circulation pipe 18 according to the rotation speed RPM of the pump motor rotating in the pump 36.

The valve assembly 100 according to the present embodiment is configured such that the washing water introduced from the pump 36 selectively circulates a first channel 124a, 124b communicating with a circulating flow path formed inside the circulation pipe 18, or a second channel 138 communicating with a drainage flow path formed inside the drainage pipe 19, depending on the disposition of a disc valve 160. Thus, the washing water introduced into the valve assembly 100 from the pump 36 may be drained to the outside of the cabinet 10 or circulated back to the tub 31, depending on the disposition of a disc valve 160.

The valve assembly 100 according to the present embodiment includes a valve housing 110 defining an outer shape and forming a space through which the washing water flows therein, a first chamber 114 which forms a space through which the washing water flows inside the valve housing 110 and is connected to the circulation flow path and the drainage flow path, and a disc valve 160 which moves inside the first chamber 114 and selectively sends the washing water in the first chamber 114 to the circulation flow path or the drain flow path, Here, the term 'connected' in the 'first chamber connected to the drainage flow path' may mean that the drainage flow path and the first chamber are directly connected without any other connection passage, or may mean that the drainage flow path and the first chamber are connected through another connection passage as the another connection passage is disposed between the drainage flow path and the first chamber. Accordingly, referring to FIG. 3, the expression 'first chamber connected to the drainage flow path' may be interpreted as a concept of including a fact that the first chamber 114 is connected to the drainage flow path through the second chamber 122 and the second channel 138.

<Valve Housing>

In the valve housing 110 according to the present embodiment, a first chamber 114 through which the washing water discharged from the pump 36 is introduced, a first channel 124a, 124b connecting the first chamber 114 and the circulation flow path, and a second channel 138 connecting the first chamber 114 and the drainage flow path are formed. In addition, a second chamber 122 which connects the first chamber 114 and the second channel 138 and in which a part of the disc valve 160 is disposed is formed inside the valve housing 110 according to the present embodiment.

The valve housing 110 according to the present embodiment may include a first valve housing 112 having the first chamber 114, the second chamber 122, and the first channel 124a, 124b formed therein, and a second valve housing 130 having the second channel 138 formed therein.

The valve housing 110 according to the present embodiment is formed with a plurality of structures of the first valve housing 112 and the second valve housing 130 as described above. However, it is just one embodiment, and is also possible that the first valve housing 112 and the second valve housing 130 are integrally formed.

The first valve housing 112 according to the present embodiment includes a housing body 113 having the first chamber 114 and the second chamber 122 formed therein, and a first connector 126a, 126b having the first channel 124a, 124b formed therein. In addition, the first valve housing 112 according to the present embodiment may further include a first fastening part 127 fastened to the second valve housing 130 and a second fastening part 128 fastened to the pump connector 150 described below. The second fastening part 128 according to the present embodiment may be formed with a fastening groove into which a separate fastening means (not shown) is inserted to be coupled to the pump connector 150.

The housing body 113 according to the present embodiment has a substantially cylindrical shape having opened top and bottom sides. The first chamber 114 and the second chamber 122 are formed inside the housing body 113. Referring to FIG. 4, the centers of the first chamber 114 and the second chamber 122 according to the present embodiment may be formed to be equal to a virtual center axis Z-Z' passing through the center of the housing body 113.

The first chamber 114 and the second chamber 122 are vertically disposed inside the housing body 113. An internal partition wall 116 separating the first chamber 114 and the second chamber 122 is formed inside the housing body 113. The internal partition wall 116 separates the first chamber 114 and the second chamber 122 from each other. A chamber communication hole 118 communicating the first chamber 114 and the second chamber 122 is formed in the center of the internal partition wall 116. The housing body 113 has a shape in which the diameter is decreased while progressing from the lower side toward the upper side. The second chamber 122 is disposed in the upper side of the housing body 113 and the first chamber 114 is disposed in the lower side of the housing body 113.

When the lower side of the first chamber 114 is opened, the first chamber 114 is connected to the pump 36 downward. The first chamber 114 defines a space through which the washing water discharged from the pump 36 is introduced. The first chamber 114 is connected to the first channel 124a, 124b connected to the circulation flow path. The first chamber 114 is connected to the second channel 138 connected to the drainage flow path. The first chamber 114 is connected to the second channel 138 through the second chamber 122 in which a second disc valve 180 of the disc valve 160 is disposed.

The first chamber 114 is disposed upstream of the second chamber 122. Referring to FIG. 4, the first chamber 114 is disposed below the second chamber 122. The first chamber 114 is disposed upstream of the first channel 124a, 124b. Referring to FIG. 4, the first chamber 114 is disposed below the first channel 124a, 124b.

That is, the second chamber 122 and the first channel 124a, 124b are disposed downstream of the first chamber 114, and the washing water of the first chamber 114 may flow to the second chamber 122 or the first channel 124a, 124b due to the disc valve 160.

A channel communication hole 120a, 120b for communicating two spaces is formed between the first chamber 114 and the first channel 124a, 124b.

The first chamber 114 defines a space in which the first disc valve 161 of the disc valve 160 to be described below is disposed. The first disc valve 161 moves vertically based on the center axis Z-Z' inside the first chamber 114, and opens and closes the channel communication hole 120a, 120b.

The flow path diameter D1 of the first chamber 114 is formed to be larger than the flow path diameter D2 of the pump channel 152, formed inside the pump connector 150, formed by the pump connector 150. Accordingly, the washing water flowing through the pump channel 152 may be pressurized while moving to the first chamber 114, and may flow while spreading in an outer radial direction. The washing water flowing in the pump 36 along the pump channel 152 may flow into the first chamber 114 having a large flow path diameter, while applying pressure to the lower surface of a disc plate 162 of the first disc valve 161.

The flow path diameter D1 of the first chamber 114 according to the present embodiment is formed to be larger than the diameter of the first disc valve 161.

The second chamber 122 sends the washing water introduced from the first chamber 114 to the second channel 138 connected to the drainage flow path. The second chamber 122 is disposed downstream of the first chamber 114. The second chamber 122 according to the present embodiment is disposed above the first chamber 114. The second chamber 122 defines a space in which the second disc valve 180 of the disc valve 160 is disposed. A disc guider 132 for guiding the upward and downward movement of the disc valve 160 is disposed in the second chamber 122.

The second chamber 122 is connected to the second channel 138. The upper side of the second chamber 122 in the first valve housing 112 according to the present embodiment is opened. When the first valve housing 112 is coupled with the second valve housing 130, the second chamber 122 is connected to the second channel 138. The diameter of the flow path formed by the second chamber 122 is formed to be smaller than the diameter of the flow path formed by the first chamber 114. The diameter of the flow path section of the second chamber 122 is formed to be larger than the diameter of the flow path section of the second channel 138.

The second chamber 122 may be an area included in the second channel 138. Therefore, as shown in FIG. 3, the second chamber 122 and the second channel 138 are not distinguished from each other, and may be described with the second channel alone. Accordingly, it may be illustrated that the second disc valve 180 and the disc guider 132 are disposed inside the second channel 138.

The first connector 126a, 126b is formed to protrude to be inclined upward from the outer circumferential surface of the upper portion of the housing body 113. A pair of the first connectors 126a and 126b according to the present embodiment formed to which are protruded from opposite sides of the outer circumferential surface of the housing body 113 are provided. Each of the pair of connectors is disposed symmetrically with respect to the center axis Z-Z' of the housing body 113. Each of the pair of connectors is connected to each of a pair of circulation pipes 18 connected to the tub 31.

The first connector 126a, 126b is disposed in the upper side of the first chamber 114. Accordingly, the first channel 124a, 124b formed inside the first connector 126a, 126b is connected to the first chamber 114 in the upper side of the first chamber 114. The first channel 124a, 124b formed inside the first connector 126a, 126b has a cross-sectional area of the flow path that is reduced while progressing from upstream to downstream. Therefore, the flow rate of the washing water flowing to the circulation pipe 18 may be increased.

The second valve housing 130 includes a second connector 131 forming the second channel 138 therein and a disc guider 132 guiding the upward and downward movement of the disc valve 160.

The second channel 138 is disposed downstream of the second chamber 122. The second channel 138 is disposed in the upper side of the second chamber 122. The diameter of the flow path section of the second channel 138 is reduced while progressing toward the downstream. Therefore, the flow rate of the washing water flowing to the drain pipe 19 may be increased.

The disc guider 132 is disposed in the lower side of the second connector 131. The disc guider 132 according to the present embodiment is disposed inside the second chamber 122 when the first valve housing 112 and the second valve housing 130 are coupled.

The disc guider 132 is formed in a cylindrical shape along the center axis Z-Z' of the first valve housing 112, and has a guider groove 133, to which a disc connecting bar 200 of the disc valve 160 is inserted, formed therein. The disc connecting bar 200 of the disc valve 160 is inserted into the guider groove 133 of the disc guider 132 and may move upward and downward along the center axis Z-Z'.

The second valve housing 130 according to the present embodiment may further include a guider connection part 134 which is connected to the disc guider 132 at the lower end of the second connector 131 and supports the disc guider 132. The guider connection part 134 may be formed in a plurality of bar shapes so that the disc guider 132 is fixed to the lower side of the second valve housing 130 without interfering with the flow of the washing water.

In addition, the second valve housing 130 may further include a fastening part 142 fastened to the first valve housing 112. The second valve housing 130 according to the present embodiment is disposed in the upper side of the first valve housing 112. The fastening part 142 of the second valve housing 130 and the first fastening part 127 of the first valve housing 112 may be fixed by a separate fastening member (not shown).

The second valve housing 130 according to the present embodiment is disposed along the center axis Z-Z' passing through the center of the housing body 113 of the first valve housing 112.

The valve housing 110 according to the present embodiment includes a pump connector 150 which is connected to the pump 36 and sends the washing water discharged from the pump 36 to the first chamber 114. The pump connector 150 according to the present embodiment connects the pump 36 with a space inside the valve housing 110.

The pump connector 150 forms a pump channel 152 through which washing water flows. The diameter D2 of the flow path section formed by the pump channel 152 is formed to be smaller than the diameter D1 of the flow path section formed by the first chamber 114. Accordingly, when the washing water flowing in the pump connector 150 flows into the first chamber 114, it may be pressurized and flow while spreading in an outer radial direction. The pump connector 150 may include a fastening part 158 that is fastened to the first valve housing 112.

<Disc Valve>

The disc valve 160 according to the present embodiment selectively opens and closes the chamber communication hole 118 formed between the first chamber 114 and the second chamber 122 or the channel communication hole 120a, 120b formed between the first chamber 114 and the first channel 124a, 124b. The disc valve 160 according to the present embodiment may be disposed to move upward and downward along the center axis Z-Z' and close the chamber communication hole 118 or the channel communication hole 120a, 120b.

The disc valve 160 according to the present embodiment may block the chamber communication hole 118 or the channel communication hole 120a, 120b according to a difference in the magnitude of the pressure caused by the weight generated in a weight part described below and the pressure of the washing water discharged from the pump 36.

The disc valve 160 according to the present embodiment may include a first disc valve 161 which is disposed inside the first chamber 114 and opens and closes the channel communication hole 120a, 120b, a second disc valve 180 which is disposed inside the second chamber 122 and opens and closes the chamber communication hole 118, and a disc connecting bar 200 which connects the first disc valve 161 and the second disc valve 180.

The first disc valve 161 may move to one side according to the pressure of the washing water flowing into the first chamber 114. The first disc valve 161 according to the present embodiment may move upward according to the pressure of the washing water discharged from the pump 36. The first disc valve 161 is disposed to be spaced by a certain distance from the inflow end of the first chamber 114.

The first disc valve 161 according to the present embodiment includes a disc plate 162 receiving the pressure of the washing water introduced into the first chamber 114, a sealer 172 which is disposed in the upper side of the disc plate 162 and seals the channel communication hole 120a, 120b, and a disc connecting portion 164 to which the disc connecting bar 200 is connected.

The disc plate 162 according to the present embodiment may have a ring-like plate shape whose center is opened in the up and down direction. The disc plate 162 according to the present embodiment may have a through hole 166, through which washing water flows, formed in a central portion thereof.

Referring to FIG. 3, the diameter D3 of the through-hole 166 formed inside the disc plate 162 may be formed to be substantially equal to the diameter of the pump channel 152 formed inside the pump connector 150. Referring to FIG. 3, the outer diameter D4 of the disc plate 162 is formed to be larger than the diameter D2 of the pump channel 152 formed inside the pump connector 150 and smaller than the diameter D1 of the first chamber 114.

The lower surface of the disc plate 162 may be formed flat to be influenced by the water pressure of the washing water introduced into the first chamber 114. The first disc valve 161 is disposed to be spaced apart by a certain distance from the inflow end of the first chamber 114. Accordingly, the washing water which is introduced into the first chamber 114 from the pump connector 150 and sprayed in an outer radial direction may press the lower surface of the first disc valve 161.

The sealer 172 is disposed in the upper surface of the disc plate 162. The sealer 172 according to the present embodiment is disposed in the upper surface of the disc plate 162. The sealer 172 according to the present embodiment may be formed into a ring shape. The sealer 172 according to the present embodiment blocks the channel communication hole 120a, 120b when the disc valve 160 moves upward. The sealer 172 according to the present embodiment has a convex shape upward.

The disc connecting part 164 according to the present embodiment is connected to the disc connecting bar 200. The disc connecting part 164 according to the present embodiment is disposed on the through hole 166 formed in the center of the disc plate 162. The disc connecting part 164 according to the present embodiment is disposed in the center of the disc plate 162. The disc connecting part 164 may be connected to the disc plate 162 and a support 168.

The disc connecting part 164 according to the present embodiment is formed with a connecting bar groove 170 into which the disc connecting bar 200 is inserted. The disc connecting bar 200 may be fixed to the disc connecting part 164 by a separate fastening means 206. The disc connecting bar 200 may have a fastening groove 202 into which the fastening means 206 can be inserted.

The second disc valve 180 may move toward the other side opposite to the one side by the pressure caused by the load of the weight part 184, 190 connected in one side. The second disc valve 180 according to the present embodiment may move downward according to the pressure of the load of the weight part 184, 190.

The second disc valve 180 according to the present embodiment includes a valve cork 182 for opening and closing the chamber communication hole 118 formed between the first chamber 114 and the second chamber 122, and a weight housing 186 forming a space in which a first weight 188 is accommodated in the upper side of the valve cork 182.

The valve cork 182 according to the present embodiment has a convex shape downward. The valve cork 182 according to the present embodiment has a truncated cone shape whose area decreases downward. The weight housing 186 is disposed in the upper side of the valve cork 182.

The weight housing 186 is extended to the upper side of the valve cork 182 and defines a space in which the first weight 188 is disposed. The weight housing 186 may have a hollow cylindrical shape. A plurality of first weights 188 may be accommodated in the weight housing 186 in consideration of the pressure of the washing water discharged from the pump 36.

The first weight 188 is disposed inside the weight housing 186. The first weight 188 may have a flat disc shape, and a hole through which the disc connecting bar 200 can pass may be formed along the center thereof. A plurality of first weights 188 may be disposed inside the weight housing 186. The number of the first weight 188 may be differently disposed in consideration of the pressure of the washing water discharged from the pump 36.

The disc connecting bar 200 according to the present embodiment connects the first disc valve 161 and the second disc valve 180. The disc connecting bar 200 is fixed to the first disc valve 161 and the second disc valve 180, respectively. The disc connecting bar 200 disposes the first disc valve 161 and the second disc valve 180 to be spaced apart by a certain distance.

The upper end of the disc connecting bar 200 is inserted into the guider groove 133 of the disc guider 132. The disc connecting bar 200 may move up and down along the guider groove 133 of the disc guider 132. The disc connecting bar 200 transfers the pressure of the washing water acting on the first disc valve 161 to the second disc valve 180. The disc connecting bar 200 transfers the pressure due to the weight of the weight part 184, 190 acting on the second disc valve 180 to the first disc valve 161.

<Weight Part>

The valve assembly 100 according to the present embodiment includes the weight part 184, 190 for applying pressure caused by weight to the disc valve 160. The weight part 184, 190 according to the present embodiment may use a weight that applies pressure caused by weight to the disc valve 160 downward. However, this is just one embodiment, and may be replaced with a member capable of applying a certain amount of pressure caused by gravity to the disc valve 160.

The weight part 184, 190 according to the present embodiment may be disposed to apply pressure to the disc valve 160 in the direction opposite to the direction in which the washing water flows. That is, the weight part 184, 190 may be disposed above the disc valve 160.

The washing water introduced from the pump 36 disposed below the valve assembly 100 flows from the lower side to the upper side. On the other hand, the weight part 184, 190 may be disposed above the disc valve 160 so as to apply pressure in the direction opposite to the direction in which the washing water flows according to weight due to gravity.

Accordingly, the weight part 184, 190 may press the disc valve 160 in the direction opposite to the flow direction of the wash water.

The weight part 184, 190 according to the present embodiment includes a first weight part 184 which is disposed above the disc valve 160 and applies a load to the disc valve 160, and a second weight part 184 which is disposed above the disc valve 160 to be spaced apart and applies a load to the disc valve 160.

The first weight part 184 according to the present embodiment may be disposed above the disc valve 160. Referring to FIG. 3, the first weight part 184 according to the present embodiment is disposed on the upper portion of the second disc valve 180. That is, the first weight part 184 may be disposed in the second chamber 122.

The first weight part 184 includes the weight housing 186 defining a space for accommodating the first weight 188 in the upper side of the valve cork 182 of the second disc valve 180, and the first weight 188 that is accommodated inside the weight housing 186 and applies a load to the disc valve 160.

The second weight part 190 according to the present embodiment may be disposed in the upper side of the disc guider 132. The second weight part 190 may be connected to the disc connecting bar 200 in the upper side of the disc connecting bar 200. The second weight part 190 according to the present embodiment may be disposed inside the second channel 138.

The second weight part 190 includes a weight case 194 forming a space for accommodating the second weight 192, a weight part-connecting portion 196 connecting the weight case 194 to the disc connecting bar 200, and a second weight 192 disposed inside the weight case 194 and applying a load to the disc valve 160.

The weight case 194 according to the present embodiment may be formed in a cylindrical shape having a hollow interior, and a plurality of second weights 192 may be disposed in the hollow interior. A plurality of second weights 192 according to the present embodiment may be disposed inside the weight case 194.

The weight part-connecting portion 196 may protrude downward from the lower end of the weight case 194 and may be inserted into a connection groove 204 formed in the upper end of the disc connecting bar 200.

<Operation of Disc Valve>

Figure 10A:
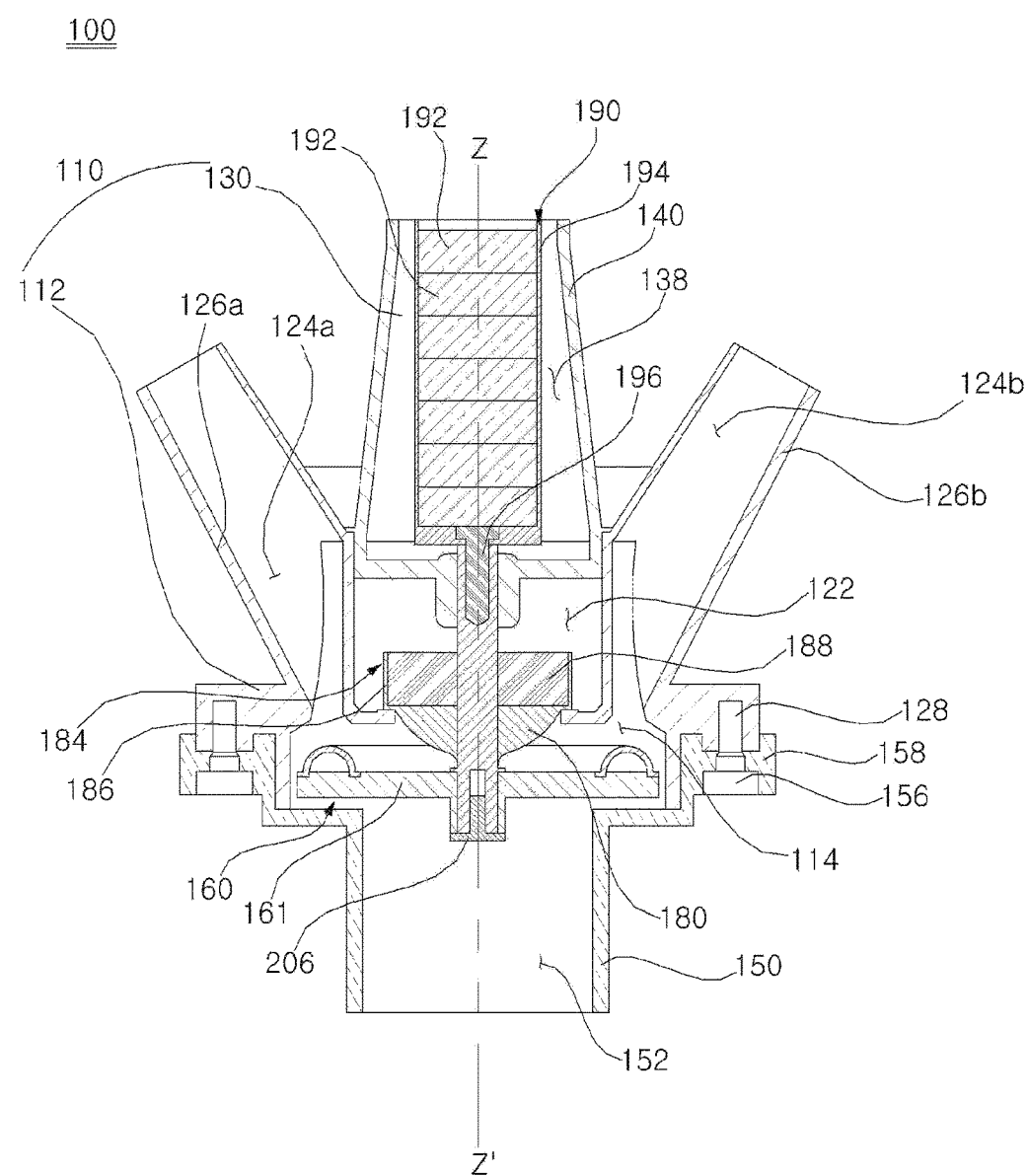
FIG. 10A is a cross-sectional view illustrating a valve assembly when a disc valve is disposed in a first position according to an embodiment of the present invention.
Figure 10B:
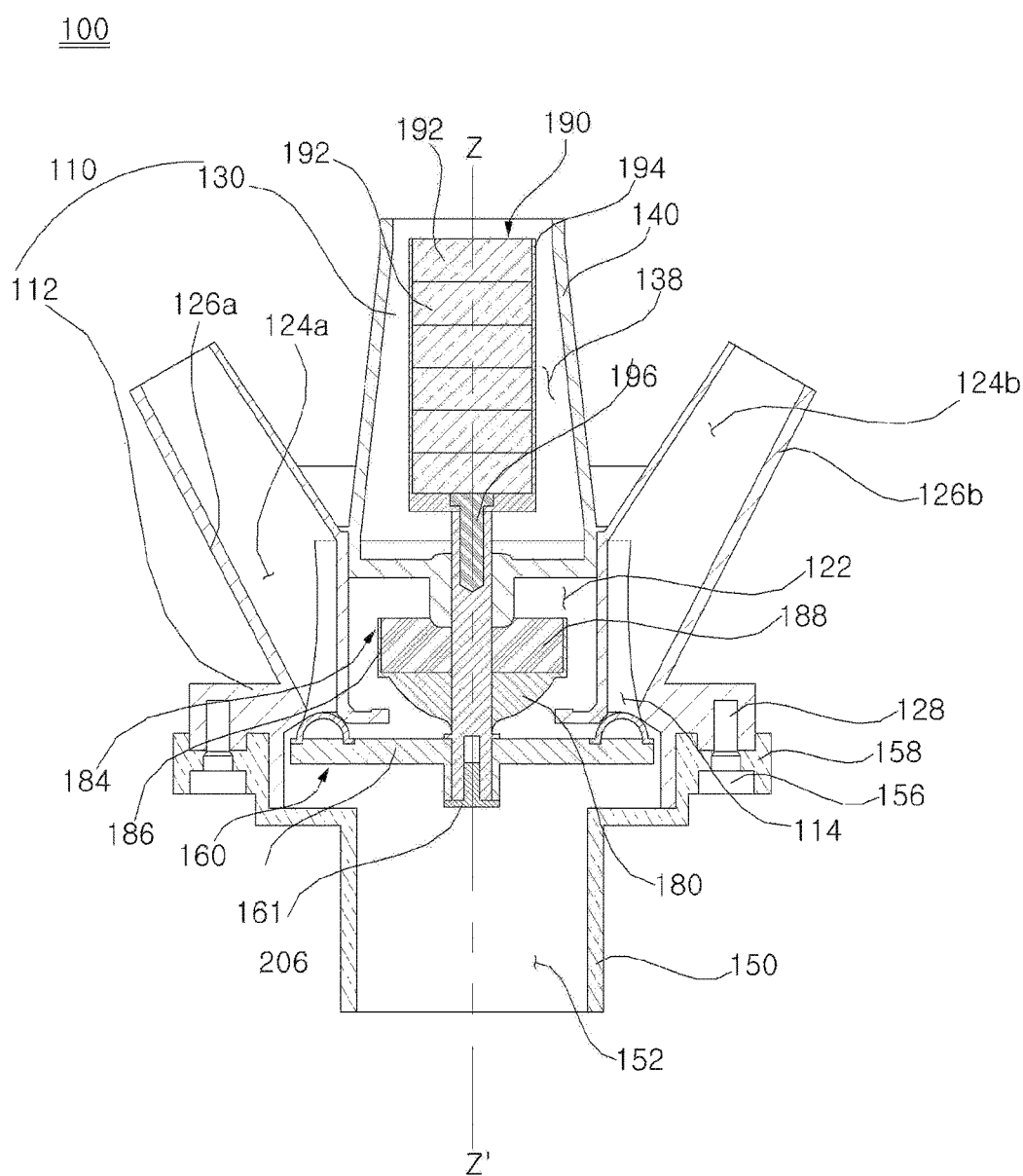
FIG. 10B is a cross-sectional view illustrating a valve assembly when a disc valve is disposed in a second position according to an embodiment of the present invention.
Figure 11A:
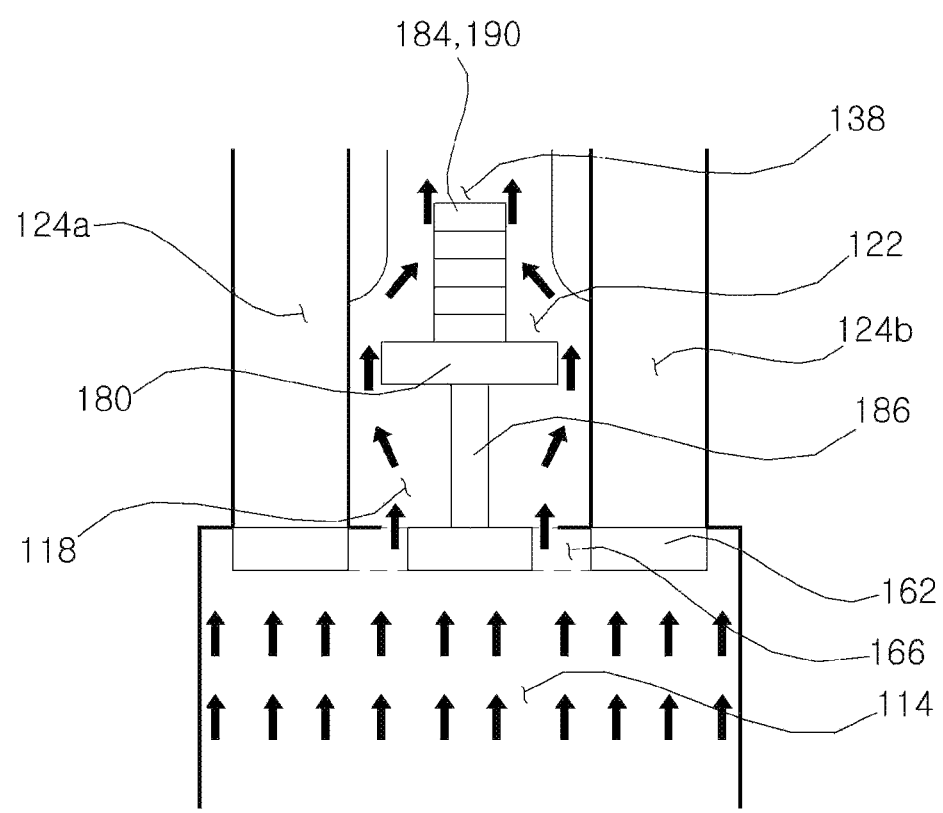
FIG. 11A is a view for explaining the flow of washing water in the disposition of FIG. 10A.
Figure 11B:
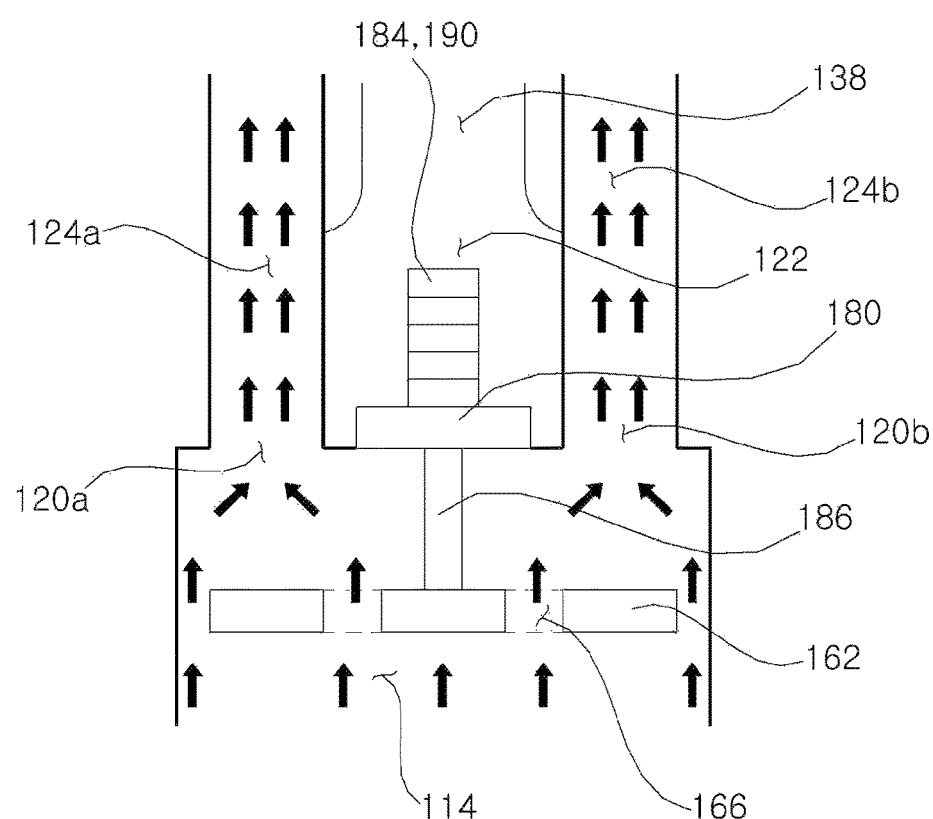
FIG. 11B is a view for explaining the flow of washing water in the disposition of FIG. 10B.

FIG. 10A is a cross-sectional view illustrating a valve assembly when a disc valve is disposed in a first position according to an embodiment of the present invention. FIG. 10B is a cross-sectional view illustrating a valve assembly when a disc valve is disposed in a second position according to an embodiment of the present invention. FIG. 11A is a view for explaining the flow of washing water in the disposition of FIG. 10A. FIG. 11B is a view for explaining the flow of washing water in the disposition of FIG. 10B.

The pump motor disposed inside the pump 36 according to the present embodiment may have different numbers of revolutions, in the case of draining the washing water in the tub 31, and in the case of circulating the washing water in the tub 31.

In a drainage mode in which the washing water in the tub 31 is drained to the outside of the cabinet 10, the pump according to the present embodiment discharges the washing water at a first set pressure. In the drainage mode, the pump motor of the pump 36 according to the present embodiment rotates at a first set rotational speed.

In a circulation mode in which the washing water in the tub 31 is returned to the tub 31, the pump 36 according to the present embodiment discharges the washing water at a second set pressure. In the circulation mode, the pump motor of the pump 36 according to the present embodiment rotates at a second set rotational speed.

The pump motor of the pump 36 rotates faster in the drainage mode than in the circulation mode. Therefore, the pressure of the washing water discharged through the pump 36 in the drainage mode is formed to be larger than the pressure of the washing water discharged through the pump 36 in the circulation mode. That is, the first set pressure is formed to be larger than the second set pressure. The first set rotational speed is formed to be larger than the second set rotational speed.

The weight part 184, 190 applies a downward pressure to the disc valve 160 by using a load. When the washing machine is not operated, only the pressure due to the load of the weight part 184, 190 is provided to the disc valve 160. Therefore, when the washing machine is not operated, the disc valve 160 is disposed in the lower side within a movable range.

When the pressure due to the load of the weight part 184, 190 is applied to the disc valve 160, the disc valve 160 is disposed in a portion in which the internal partition wall 116 formed in the outer circumference of the chamber communication hole 118 abuts against the second disc valve 180. That is, when the washing machine is not operated, the disc valve 160 is disposed below by the weight part 184, 190 to close the chamber communication hole 118.

The pressure applied to the disc valve 160 by the load of the weight part 184, 190 is formed to be smaller than the pressure applied to the disc valve 160 by the washing water discharged by the pump 36 in the drainage mode. The pressure applied to the disc valve 160 by the load of the weight part 184, 190 is formed to be larger than the pressure applied to the disc valve 160 by the washing water discharged by the pump 36 in the circulation mode.

In the drainage mode of the washing machine, the pressure applied to the disc valve 160 by the washing water discharged from the pump 36 is formed to be larger than the pressure applied to the disc valve 160 by the weight part 184, 190, so that the disc valve 160 moves in the flow direction of the washing water. That is, in the drainage mode of the washing machine, the disc valve 160 moves upward.

In the drainage mode of the washing machine, the disc valve 160 is disposed in a first position. In the first position of the disc valve 160, the first disc valve 161 is disposed to block the channel communication hole 120*a*, 120*b* and the second disc valve 180 is disposed to be spaced apart by a certain distance in the chamber communication hole 118 to open the chamber communication hole 118.

In the circulation mode of the washing machine, the pressure applied to the disc valve 160 by the washing water discharged from the pump 36 is formed to be smaller than the pressure applied to the disc valve 160 by the weight part 184, 190, so that the disc valve moves in the direction in which the load of the weight part 184, 190 is applied. That is, in the circulation mode of the washing machine, the disc valve 160 moves downward.

In the circulation mode of the washing machine, the disc valve 160 is disposed in a second position. In the second position of the disc valve 160, the second disc valve 180 is disposed to block the chamber communication hole 118, and the first disc valve 161 is disposed to be spaced apart by a certain distance in the channel communication hole 120*a*, 120*b* to open the channel communication hole 120*a*, 120*b*.

According to the washing machine of the present invention, one or more of the following effects can be obtained.

First, drainage and circulation can be performed simultaneously using a single pump, which is advantageous in that material cost can be reduced compared to using two pumps.

Second, drainage and circulation can be performed according to the pressure of the washing water discharged from the pump without using the bidirectional pump, thereby reducing the cost and preventing the reverse flow of the washing water.

Third, since the weight part that uses gravity is used as a force acting in opposition to the pressure of the washing water, the problem caused by the failure of the component is eliminated even with long use of the valve assembly. Therefore, there is an advantage that it can be used for a long time without replacing any component.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A washing machine comprising:
   a cabinet that defines an outer shape of the washing machine;
   a tub disposed inside the cabinet and configured to receive washing water;
   a pump configured to discharge washing water received in the tub to an outside of the tub; and
   a valve assembly having a lower side configured to receive washing water discharged from the pump, and an upper side configured to discharge washing water received through the lower side of the valve assembly,
   wherein the valve assembly comprises:
      a valve housing that defines an exterior of the valve assembly and that defines a valve space therein configured to receive washing water,
      a first chamber that is defined inside the valve housing and that is configured to connect to (i) a circulation flow path configured to guide washing water to the tub and (ii) a drainage flow path configured to guide washing water to an outside of the cabinet,
      a disc valve configured to linearly move inside the first chamber along a vertical direction based on a water pressure applied by washing water discharged from the pump toward the first chamber, and
      a weight part configured to apply a load to the disc valve,
   wherein the disc valve is configured to, based on a difference between a first magnitude corresponding to the water pressure and a second magnitude corresponding to the load, selectively discharge washing water in the first chamber to the circulation flow path or to the drainage flow path,
   wherein the valve housing defines therein a first channel that connects the first chamber to the circulation flow path, and a second channel that connects the first chamber to the drainage flow path, and
   wherein the disc valve comprises:
      a first disc valve disposed inside the first chamber and configured to open and close a channel communication hole defined between the first chamber and the first channel,
      a second disc valve disposed vertically above the first chamber and configured to open and close a chamber communication hole defined between the first chamber and the second channel, and
      a disc connecting bar that connects the first disc valve and the second disc valve to each other.

2. The washing machine of claim 1, wherein the disc valve is configured to, based on the water pressure exceeding a set pressure, connect the first chamber to the drainage flow path.

3. The washing machine of claim 1, wherein the disc valve is configured to, based on the water pressure being less than or equal to a set pressure, connect the first chamber to the circulation flow path.

4. The washing machine of claim 1, wherein the pump is configured to, based on the valve assembly being in a circulation mode in which washing water is circulated to the tub, discharge washing water to maintain the water pressure to be less than or equal to the load applied to the disc valve by the weight part.

5. The washing machine of claim 1, wherein the pump is configured to, based on the valve assembly being in a drainage mode in which washing water is discharged to the outside of the cabinet, discharge washing water to maintain the water pressure to be greater than the load applied to the disc valve by the weight part.

6. The washing machine of claim 1, wherein the first disc valve is configured to receive the water pressure in an upward direction from washing water introduced toward the first chamber,
   wherein the second disc valve is configured to receive the load in a downward direction from the weight part, and
   wherein the weight part is disposed at an upper side of the second disc valve, and configured to apply the load to the second disc valve in the downward direction to allow the first chamber to be connected to the circulation flow path.

7. The washing machine of claim 1, wherein the first disc valve comprises:
   a disc plate configured to receive the water pressure applied by washing water introduced toward the first chamber; and
   a sealer disposed at an upper side of the disc plate and configured to open and close the channel communication hole.

8. The washing machine of claim 1, wherein the second disc valve has a conical shape with a sectional area decreasing downward, and is configured to open and close the chamber communication hole.

9. The washing machine of claim 1, wherein the weight part comprises:
   a first weight part disposed vertically above the second disc valve and configured to apply a first portion of the load to the first and second disc valves; and
   a second weight part connected to an upper end of the disc connecting bar and configured to apply a second portion of the load to the first and second disc valves.

10. The washing machine of claim 9, wherein the first weight part comprises:
    one or more first weight pieces configured to apply the first portion of the load to the first and second disc valves; and
    a weight housing that is disposed vertically above the second disc valve and that defines a space configured to accommodate the one or more first weight pieces.

11. The washing machine of claim 9, wherein the second weight part comprises:

one or more second weight pieces configured to apply the second portion of the load to the first and second disc valves;

a weight case that defines a space configured to accommodate the one or more second weight pieces; and a weight connecting portion that connects the weight case to the disc connecting bar.

12. The washing machine of claim 1, further comprising:
a disc guider that defines a guider groove configured to receive at least a portion of the disc connecting bar and to guide a vertical movement of the first and second disc valves inside the valve housing.

13. The washing machine of claim 12, wherein the disc guider is disposed vertically above the first and second disc valves.

14. The washing machine of claim 12, wherein the weight part comprises:
a first weight part disposed vertically below the disc guider and configured to apply a first portion of the load to the first and second disc valves; and a second weight part that is disposed vertically above the disc guider, that is connected to an upper end of the disc connecting bar, and that is configured to apply a second portion of the load to the first and second disc valves through the disc connecting bar.

15. The washing machine of claim 1, wherein the disc connecting bar extends in the vertical direction and penetrates through the first and second disc valves.

16. The washing machine of claim 1, wherein the circulation flow path surrounds at least a portion of the drainage flow path.

17. The washing machine of claim 1, wherein the drainage flow path extends in the vertical direction, and
wherein the circulation flow path extends in a direction inclined with respect to the vertical direction.

18. The washing machine of claim 1, further comprising:
a pump connecter disposed at the lower side of the valve assembly and configured to supply washing water to the first chamber based on movement of the disc valve along the vertical direction.

* * * * *